June 21, 1932.  W. H. SILVER  1,863,641
DISK TILLER
Filed Aug. 12, 1927  3 Sheets-Sheet 3
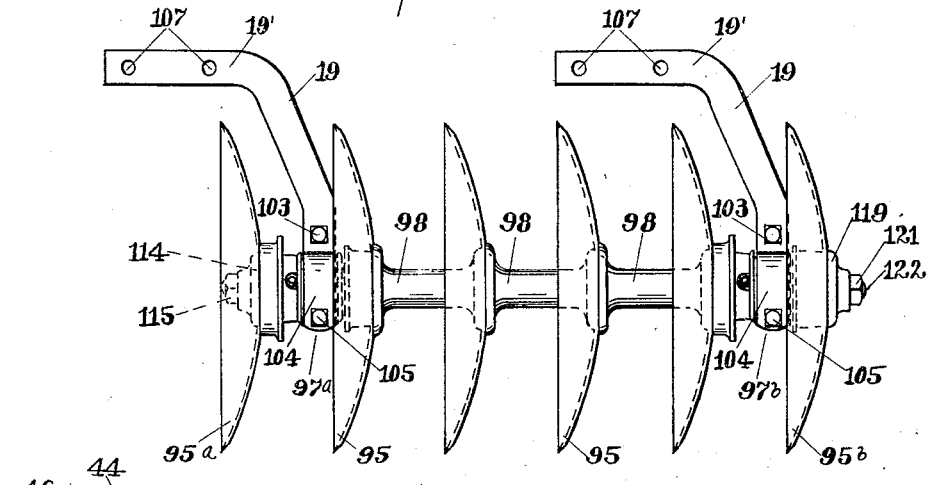
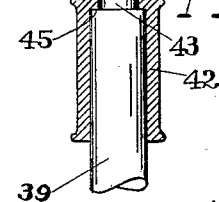
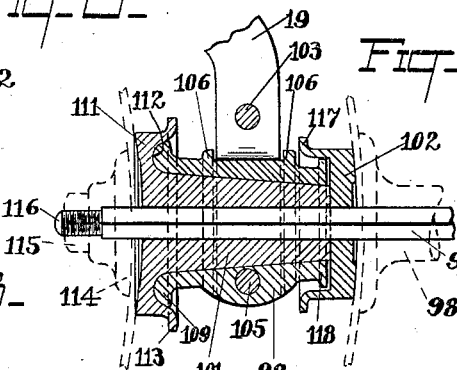
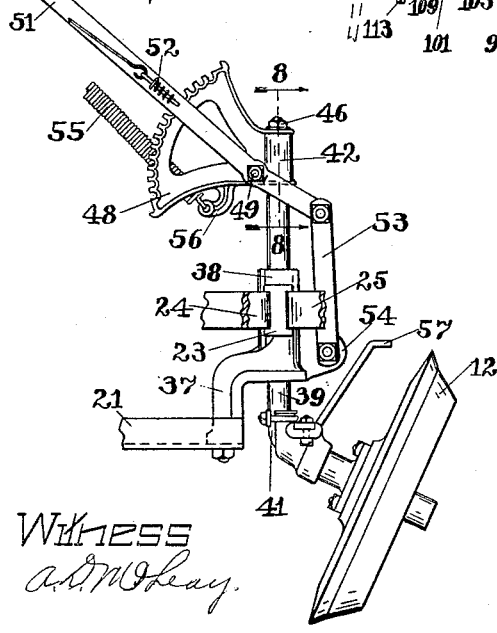
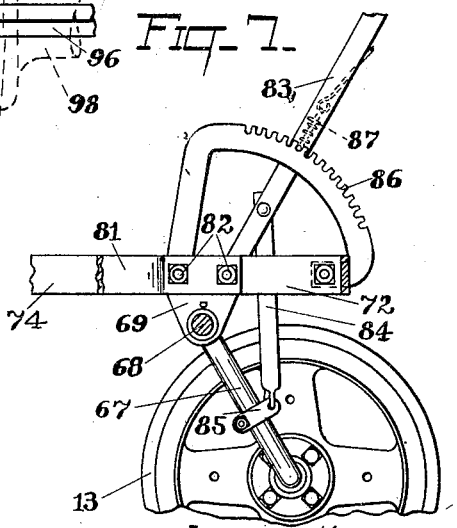
Inventor
Walter H. Silver
by John L. Jackson
Attorney
Witness
A. D. McLeay.

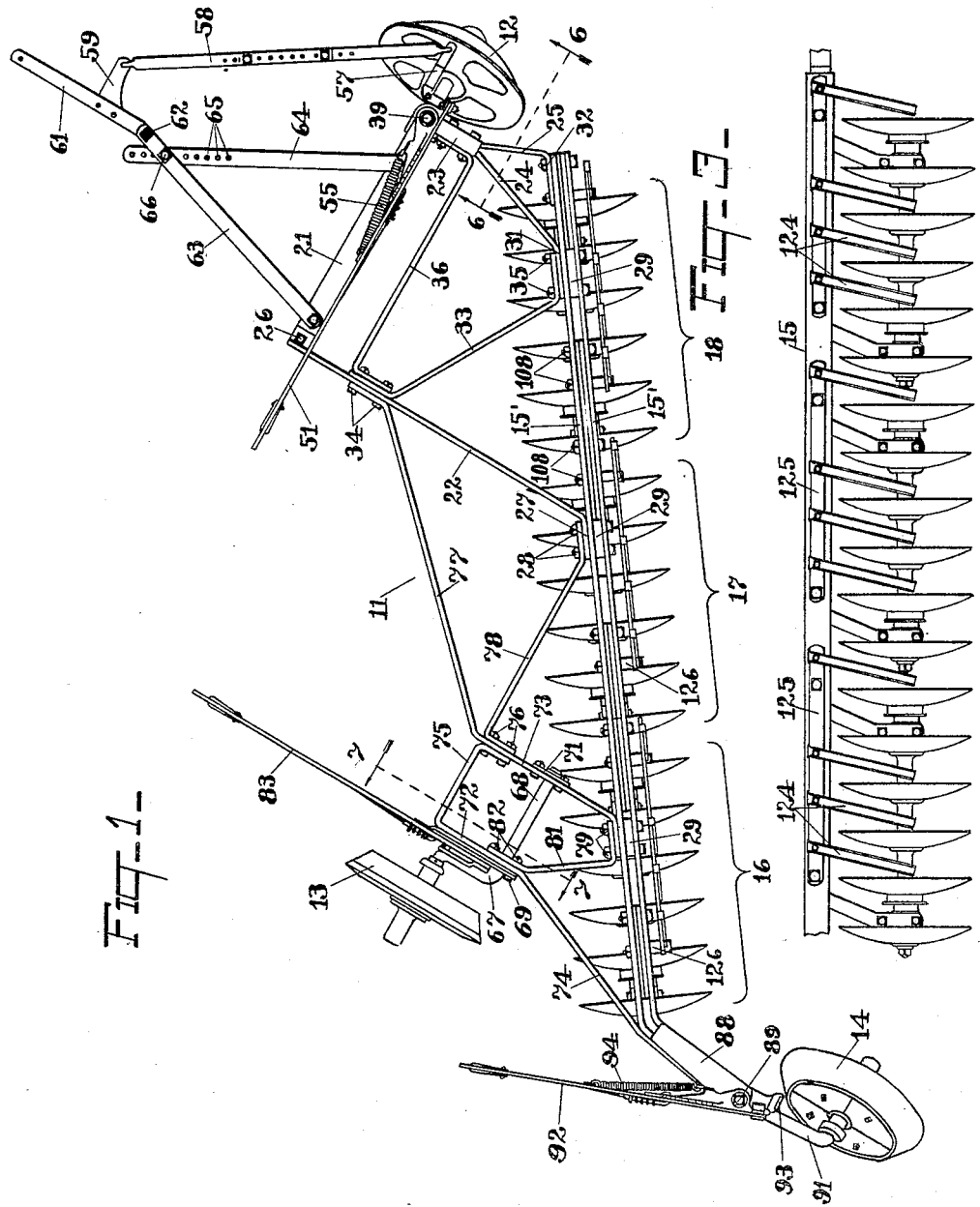

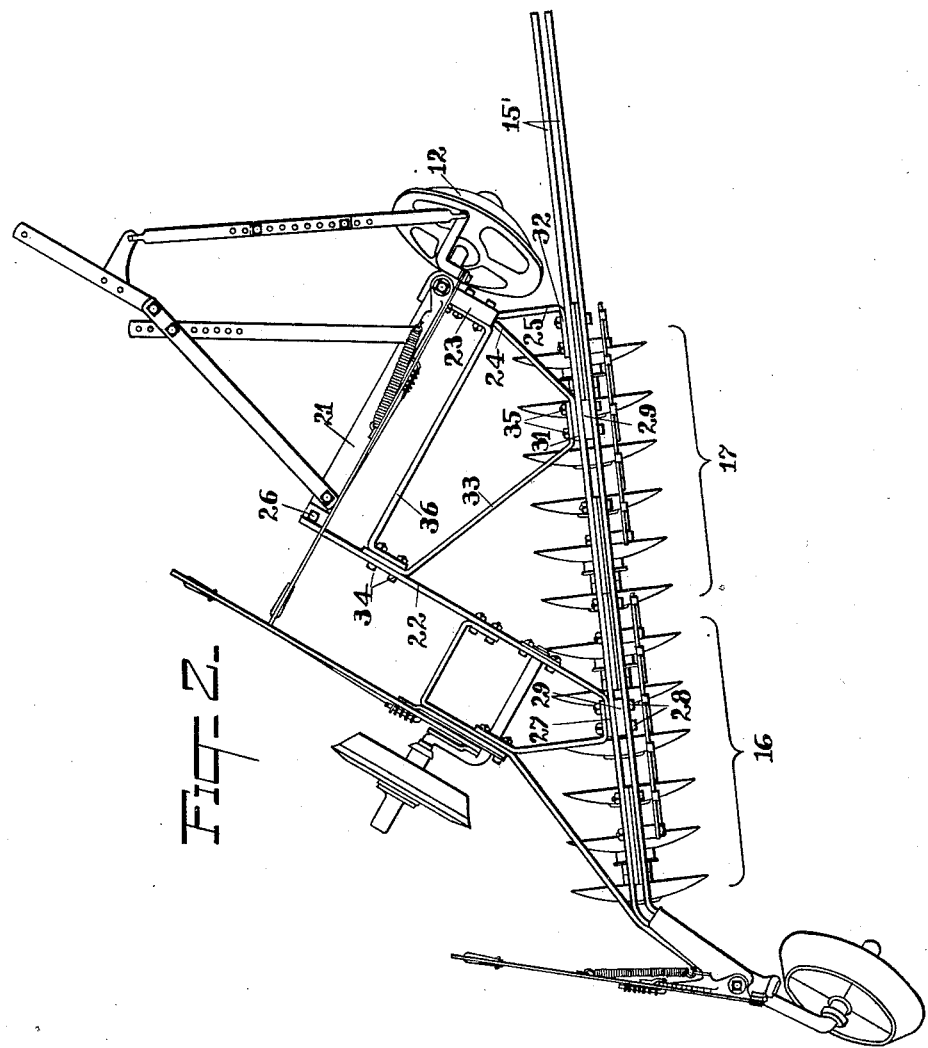

Patented June 21, 1932

1,863,641

UNITED STATES PATENT OFFICE

WALTER H. SILVER, OF MOLINE, ILLINOIS, ASSIGNOR TO DEERE & COMPANY, OF MOLINE, ILLINOIS, A CORPORATION OF ILLINOIS

DISK TILLER

Application filed August 12, 1927. Serial No. 212,434.

The present invention relates to tilling implements of the type characterized by a series of disks which are arranged in axial alignment, all facing in the same direction, and with the axis of the disks extending at an angle to the line of draft of the implement. The patents to Grant, No. 853,510, dated May 14, 1907, and to Underwood, No. 461,153, dated October 13, 1891, are representative of the general type of implement to which I refer. Such implements are extensively used as disk plows in certain soils, particularly where a comparatively shallow plowing depth suffices in preparing the seed bed.

As these implements have been heretofore constructed, all of the disks have been rigidly joined together across the entire width of the machine so that the disks of the entire gang must roll together at the same speed. Difficulty is encountered in turning this type of implement because the disks on the outer side of the turn tend to revolve faster than those on the inner side, thus compelling some of the disks to drag. This dragging tendency is even present when the implement is plowing through a comparatively gradual curve, as around a knoll or slope, and in addition to hindering the turning and maneuvering of the implement absorbs an appreciable part of the draft power.

One of the objects of the present invention is to overcome this difficulty by employing a plurality of separate gang sections, wherein the disks of each section are capable of revolving at different speeds. Thus in turning the implement, the disks of the outer gang section are capable of rotating faster than the disks of the inner gang section, thereby minimizing the tendency of the disks to drag and avoiding loss of traction power. Numerous other advantages accrue to this use of a plurality of separate gang sections. For example, it permits the removal or addition of a gang section for cutting a narrower or wider swath as desired. This is often of considerable advantage, where the condition of the soil, or the tractive power available, may make it desirable to cut a wider or narrower swath. Another advantage of such construction is that the end thrusts of the disks can be carried at a plurality of separate bearings along the frame, thereby distributing the thrust loads instead of having them build up cumulatively along the entire series of disks to be borne by a single thrust bearing at the end of the series. In the improved construction herein disclosed, the radial and thrust loads set up in each gang section are carried by one or more bearing supports individual to that gang section.

Other objects of the invention are to provide a frame construction wherein the point of draft can be shifted laterally with respect to the frame to accommodate the removal or replacing of a gang section in the implement; to provide an improved construction of bearing for carrying the radial and thrust loads of each gang section; to provide improved means for protecting such bearings against the entrance of dirt; and to provide an improved construction of main beam and cooperating arrangement of hanger brackets or supporting arms for the gang sections, whereby when the gang sections are mounted on the beam, the implement they are rigidly secured to the beam, but are nevertheless capable of being quickly removed or replaced in adapting the implement to the cutting of a narrower or wider swath.

Referring to the accompanying drawings illustrating a preferred embodiment of the invention:

Figure 1 is a plan view of the implement.

Figure 2 is a similar view, showing one of the gang sections removed and the draft frame shifted laterally to adapt the implement to the lesser number of gang sections.

Figure 3 is a rear elevational view illustrating the mounting of the gang sections on the beam.

Figure 4 is an elevational view of one of the gang sections removed.

Figure 5 is an axial sectional view through one of the combined radial and thrust bearings.

Figure 6 is a detail sectional view taken on the plane of the line 6—6 of Figure 1, illustrating the lifting mechanism for the front furrow wheel.

Figure 7 is a similar view taken on the plane of the line 7—7 of Figure 1, illustrating the lifting mechanism for the intermediate land wheel, and Figure 8 is a detail sectional view taken on the plane of the line 8—8 of Figure 6.

The implement comprises a frame structure 11 which is made up of different frames or component frame members, as I shall hereinafter describe. The main frame in its entirety is supported on three wheels 12, 13 and 14, each having individual depth-adjusting levers, to be hereinafter described, which serve to effect the depth adjustments of the implement. One of the component parts of the main frame consists of a beam structure 15 built up of two spaced parallel bars 15'—15', which beam structure constitutes the backbone of the entire frame. This beam structure extends diagonally with respect to the line of draft, and with the leading end thereof on the furrowward side of the implement. The several gang sections, to which I have previously referred, are supported by the beam 15, preferably directly below the latter and extending parallel therewith at the same angle to the line of draft. Three of such sections have been shown, designated 16, 17 and 18 respectively, although it will be apparent that the complete gang or series of disks can be made up of any desired number of sections. Each gang is supported on the beam 15 by hanger brackets 19—19 which extend upwardly from the end portions of the gang (Figure 4) and which are constructed for detachable bolting between the spaced bars of the beam structure. A description of the detailed construction of the gangs will be hereinafter made in a subsequent part of the present specification.

Mounted at the front end of the beam 15 and constituting part of the complete frame structure, is an arrangement of bars and braces which I shall hereinafter refer to as a draft frame. More specifically, this draft frame comprises a transversely extending draft member 21, a rearwardly extending bar 22 at the inner end thereof, a rearwardly extending bracket 23 at the outer end thereof, and two divergent bars 24 and 25 projecting from the rear end of such bracket. The transverse draft bar 21 is disposed below the plane of the beam 15, and the front end of the longitudinal bar 22 is curved downwardly for bolting to the end of the draft member 21 as indicated at 26. The rear portion of the longitudinal bar 22 has a diagonally bent end 27 which serves as an attaching portion for bolting to the front side of the beam 15. The bolts 28 which pass through this attaching portion and through the spaced bars of the beam structure also pass through a spacing block 29 which is interposed between these bars. There are a plurality of such spacing blocks interposed between the two beam bars at different points along the length of the beam, for maintaining the bars in fixed spaced relation for receiving the upper ends of the hanger brackets 19. The upper portion of the bracket 23 is of I-section and the front ends of the bars 24—25 are secured to opposite sides thereof, the rear portions of these same bars having diagonally bent ends 31 and 32 for bolting to the beam 15. The draft frame is braced transversely by a diagonal bracing link 33 which is bolted at its front end to the longitudinal bar 22, as indicated at 34. The rear end of such bracing link is secured to the beam 15 by the bolts 35 which also pass through the attaching portion 31 of the bar 24, and through another spacing block 29 between the bars of the beam structure. If desired, a transverse brace 36 may be extended between the longitudinal bar 22 and bracket 23 in rear of the draft member 21.

Referring to Figure 6, the bracket 23 is formed with a lower portion 37 to which the outer end of the draft member 21 is rigidly secured. The upper portion of this bracket is formed with a vertical sleeve 38 in which a wheel standard 39 is slidably and rotatably supported. The lower end of such wheel standard carries an inclined spindle 41, on which the front furrow wheel 12 is journaled. The resulting inclination of the furrow wheel aids in resisting the side draft of the disks, such wheel normally traveling against the landside of the furrow or swath which has been previously cut in the travel of the implement across the field.

Referring to Figure 8, it will be noted that a sleeve 42 is mounted for free rotative movement on the upper end of the wheel standard 39. The standard is formed with a relatively reduced portion 43, and extending beyond the reduced portion is a threaded portion 44, which is of still smaller diameter than the reduced portion 43. The sleeve or bracket member 42 has an inwardly extending flange 45, resting upon the shoulder formed at the base of the reduced portion 43. A nut 46 and washer 47 engage over the threaded upper end 44 and bear against the shoulder at the base end of the threaded portion. Formed as an integral part of sleeve 42 is a latching quadrant 48. Pivotally mounted at 49 on such bracket or quadrant is a lifting lever 51, having any well known dog mechanism 52 for effecting latching engagement with the quadrant. A link 53 is pivotally connected between the lower end of such lever and a lug 54 projecting from the bracket 23. It will be evident that the operation of the lever 51 will function to raise or lower the front of the frame by causing the sleeve 38 to slide upwardly or downwardly along the wheel standard 39. The weight of the front portion of the implement may be partially counterbalanced by a tension spring 55 extending between the upper portion of the lever 51 and an arm 56 on the bracket 48.

Secured to the wheel standard 39 is a laterally extending steering arm 57 to which is pivotally connected an adjustable steering link 58 (Figure 1). The front end of such link is pivotally connected with an arm 59 projecting laterally from the draft hitch 61, which is adapted to be connected at its front end to a tractor or other source of tractive power. The rear end of the hitch member 61 is pivotally connected at 62 with a draft link 63, which is secured to the landward end of the transverse draft bar 21. A second draft link 64 is connected with the furrowward end of the draft bar 21 and at its forward end is provided with a series of holes 65 for adjustable connection at 66 with the other draft link 63. It will be apparent from the foregoing that when the tractor is turned at the ends or corners of the field, the hitch member 61 will swing about its pivot 62 and will transmit proportionate steering movement through the arm 59 and link 58 to the steering arm 57 of the front furrow wheel 12, the wheel standard 39 at such time revolving in the sleeve 38 of the bracket 23.

The intermediate or land wheel 13 is mounted on the outer end of a crank axle 67 which has its horizontal bearing portion 68 mounted in two spaced bearings 69 and 71. The latter are bolted to a bearing frame comprising the two bars 72 and 73, the first of which has a diagonally extending rear end 74 which is bolted to the rear end of the main beam, and also has a transversely extending front end 75 which is secured by bolts 76 to the second bar 73. The front end of the latter bar 73 extends diagonally forwardly to the draft frame, being secured thereto by the bolts 34, and forms a diagonal brace 77 between the two frames. A transverse brace 78 extends between the bearing frame and the main beam, having its ends secured thereto by the two sets of bolts 76 and 28. The rear end of the bearing frame bar 73 is secured to the main beam 15 by bolts 79, and also secured to the beam by these same bolts is another diagonal brace 81, which has its forward end secured to the other frame bar 72 by the same bolts 82 which mount the bearing 69 thereon.

Pivotally mounted on one of the bolts 82 is a lifting lever 83 (Figure 7) which has operative connection with the crank axle 67 through a link 84. The latter is pivotally connected at its upper end to the lever, and at its lower end is pivotally connected to a clip 85, secured to the crank axle. The lever swings alongside a latching quadrant 86, with which the lever has locking engagement through any suitable latch mechanism 87. It will be evident that actuation of the lever 83 will be operative to raise or lower the landside of the implement frame relative to the land wheel 13.

Referring to Figure 1, it will be noted that the landward ends of the beam bars 15′—15′ are bent rearwardly for bolting over opposite sides of a bearing block or bracket 88, which has its attaching portion also preferably constructed of I-section, similarly, to the bracket 23. Mounted for reciprocation and rotation in the bracket 88 is a wheel standard 89 which has its spindle portion 91 inclined downwardly and furrowwardly to mount the rear furrow wheel 14 at the angle shown. A lifting lever 92 is pivotally supported on the upper end of the wheel standard and has linked connection with the bracket 88 for raising and lowering the rear end of the frame. Such construction is in all essential respects a duplication of the lifting lever mechanism for the front furrow wheel 12, and need not be described in detail. It should be remarked, however, that stop 93 projects from the bracket 88 for engaging with the furrowward side of the axle 91 to prevent casterwheel movement of the rear furrow wheel when the implement is at work. At such time, the landward thrust of the frame is resisted by the engagement of the stop with the axle. When the frame is raised the stop clears the axle, permitting free caster movement of the furrow wheel 14. Preferably, the lower contacting extremity of the stop is beveled, so that if the wheel is occupying an angular position, furrowward, when the frame is being lowered, this beveled surface will shift the frame laterally to cause proper alignment of the furrow wheel, longitudinally of the frame. A tension spring 94 partially counterbalances the weight of the rear end of the implement.

Referring to Figure 4, each gang section comprises a series of disks 95, of any desired number, all mounted on a common shaft 96 individual to that section. As will hereinafter appear, the shaft 96 together with the spacing sleeves or spools between the disks and certain thrust bearings which rotate with the disks, all constitute a rigid axle for the disks. Each gang section has bearing support adjacent to its front and rear ends by bearings 97a and 97b, the front bearing 97a being located just behind the front disk 95a and the rear bearing 97b being located just in front of the rear disk 95b. Attention is directed to the fact that by such arrangement of the bearings, it is possible to give each section individual bearings for its opposite ends, without requiring additional space between sections to accommodate such bearings, and without requiring that the bearings be of narrow width. The disks intermediate the bearings are held in spaced relation by spool-shaped spacing sleeves 98, the opposite ends of which are alternately formed concave and convex to bear snugly against the convex and concave sides respectively of the disks 95. The shaft 96 is of polygonal cross section, preferably square, and the central openings of the disks and of the spools are of similar outline, so that all of the disks of the section rotate together. This also applies to the end disks 95a and 95b, all disks being duplicates.

The two end bearings 97a and 97b are also duplicates, one of such bearings being illustrated in section in Figure 5. Each bearing comprises a stationary hub or bearing sleeve 99 having a tapered bore; a spindle member 101 having a tapered outer surface for engaging in said bore; and an end spacer or cap member 102 at the rear end of the spindle member. Each bearing hanger or arm 19 consists of two duplicate bars which are secured together side by side by the bolt 103. Below such bolt, the two bars are curved outwardly and downwardly to form an inverted U-shaped lower end 104 for the arm, which embraces the top and sides of the bearing hub 99. A bolt 105 passes through this U-shaped portion and through a transverse hole in the bottom of the bearing hub, rigidly securing the two together. Spaced ribs or flanges 106 engage opposite edges of the yoke 104 and prevent angular tilting of the hub in the hanger. The upper portions of the two hanger bars incline forwardly to clear the disk directly in rear thereof and have horizontally bent upper ends 19' which are adapted to fit snugly between the two spaced bars 15' of the main beam. Pairs of aligned holes 107 in the two hanger bars receive mounting bolts 108 (Figure 1) which pass through spaced holes in the beam bars, whereby the hanger arms are rigidly secured to the beam.

The thrust resisting end of the hub 99 has an outwardly turned flange or bead 109 of circular longitudinal section. The corresponding end of the spindle member 101 has an outwardly projecting head or collar portion 111, the rear face of which is formed with a curved annular recess 112 for engaging snugly over the flange or bead 109. These two surfaces 109 and 112 form thrust bearing surfaces, which cooperate with the taper of the spindle and the taper of the hub in transmitting the end thrust to the hub. It is desirable that dirt be excluded as effectively as possible from these thrust surfaces, and to this end a peripheral flange 113 is formed on the spindle member and is arranged to overlie, or project rearwardly beyond the end of, the thrusting surfaces. It will be noted that the curve of the recess or groove 112 slopes outwardly directly to the outer side of the flange 113, thus affording a downwardly sloping surface at the lower side of the bearing which effectively sheds dirt. The front end of the spindle is formed concave to receive the convex side of the front disk 95a, and a collar 114 having a convex rear surface slips over the end of the shaft 96 to bear against the front side of the disk. A nut 115 screws over the threaded end 116 of the shaft to draw the collar up into clamping engagement with the disk, the collar having a square hole to compel rotation with the shaft.

The openings through the spindle and end members 101 and 102 are also square to compel rotation with the shaft. It will be observed that the rear end of the spindle member projects slightly beyond the end of the hub 99, so that when the end member is drawn up tight against the end of the spindle it will not bind against the hub. A peripheral flange 117 is formed on the end member 102 to overlie or project forwardly beyond the flanged rear end 118 of the hub. The two flanges 113 and 117 function to deflect soil carried up by the disks outwardly and away from the ends of the thrust bearing surfaces, forming shrouds or deflecting surfaces to prevent the entrance of dirt to the bearings. The rear surface of the end member 102 is formed convex to receive the concave front side of the next adjacent disk. In the case of the front bearing 97a, a clamping spool 98 will immediately follow this next disk. In the case of the rear bearing 97b, a collar 119 having a concave front side will bear against the convex rear side of the disk, being held against the same by a nut 121 screwing over the threaded rear end 122 of the shaft. It will be noted that the shaft 96 functions as a stringer or tie-bolt, which, by the tension set up therein through the nuts 115 and 121, serves to clamp the disks, spools and rotatable bearing members together to form in effect a rigid axle unit with the disks rigidly mounted thereon. Each hanger bracket 19 has sufficient inherent resiliency so that the end thrust of such axle is distributed uniformly between the two bearings 97a and 97b.

Associated with each gang section 16, 17 and 18 is a separate set of scraper elements 124. As best shown in Figure 3, these scraper bars extend down diagonally from mounting bars 125 which are rigidly secured to the rear side of the main beam 15, such mounting bars being preferably spaced from the beam by suitable spacing sleeves or brackets 126.

Ordinarily when soil conditions and traction power permit, the implement is operated with all three gang sections in place in the implement. However, under adverse conditions it may be very desirable to reduce the width of the plowed swath; or such may be desirable in order to plow to a greater depth with a limited traction power. Under such circumstances, the front end section 18 is removed, the same being accomplished by merely removing the bolts 108 and dropping the hanger arms 19 of the section down from their engaged positions in the beam 15. Figure 2 illustrates this condition of the implement. At such time the draft frame is also shifted rearwardly along the beam so as to place the point of draft in proper relation to the two remaining sections. This is accomplished by removing the bars 73 and 78, and shifting the draft frame so that the bar 22 takes the place of the bar 73. The bar 22 is provided with holes which will receive directly the bolts 76 and also the bolts which mount the inner bearing 71 of the crank axle 67. The other bars 24, 25 and 33 of the draft frame receive the bolts 28 and 108 on the main beam. It will be noted that the front furrow wheel 12 is carried with the draft frame in this shifting movement, so that such wheel is properly disposed to run along the landside of the previous swath, and so that there is no necessity of disconnecting or rearranging its steering linkage. When the outer gang section 18 is removed, the gang or section of scraper bars 124 corresponding thereto is also preferably removed.

Having thus described my invention what I claim as new and desire to secure by Letters Patent of the United States is:

1. In a disk tiller of the class described, the combination of a frame, a plurality of wheels adjustably supporting said frame, one of said wheels consisting of a front furrow wheel, a plurality of gang sections mounted on said frame comprising independently rotatable sets of disks all substantially aligned on a common axis which is inclined to the line of draft of said frame, one of said gang sections being removable from said frame, and means for shifting said front furrow wheel inwardly along said frame and along a line parallel to the axis of the disks upon the removal of said gang section.

2. In a disk tiller of the class described, the combination of a frame, a plurality of wheels adjustably supporting said frame, said wheels comprising a front furrow wheel, a plurality of gang sections each comprising a separate axle and a series of disks mounted thereon, said gang sections being mounted on said frame with all of the disks facing in the same direction and substantially aligned on a common axis which is inclined to the line of draft of said frame, one of said gang sections being removable from said frame, and mounting means for said front furrow wheel permitting the latter to be displaced inwardly along said frame and along a line parallel to the axis of the disks upon the removal of said gang section.

3. In a disk tiller of the class described, the combination of a frame, a plurality of wheels adjustably supporting said frame, one of said wheels consisting of a front furrow wheel, mounting means therefor adapted for attachment at different points along said frame to enable the wheel to be shifted inwardly along a line parallel to the axis of the disks, a plurality of gang sections mounted on said frame comprising independently rotatable sets of disks, the disks of all of such sections facing in the same direction and substantially aligned on a common axis which is inclined to the line of draft of said frame, and a plurality of bearings individual to each gang section for carrying the radial and thrust loads of such section.

4. In a disk tiller of the class described, the combination of a beam comprising two spaced side members, a plurality of wheels adjustably supporting said beam with the latter extending at an angle to the line of draft of the tiller, a plurality of gang sections each comprising an axle and a series of disks mounted thereon, and bearing arms in which the axles of said gang sections are journaled, the upper ends of said bearing arms being mounted between the side members of said beam.

5. In a disk tiller of the class described, the combination of a frame, front and rear furrow wheels and a land wheel supporting said frame, lifting levers operatively connected for adjusting the height of said frame relative to said wheels, a beam constituting a part of said frame and comprising two spaced, substantially parallel beam bars extending at an angle to the line of draft, and a plurality of gang sections each comprising an axle, a plurality of disks mounted thereon, and a pair of bearing arms in which said axle has bearing support, the bearing arms of the several sections having their upper ends secured between said beam bars with the axles of the sections disposed substantially in alignment.

6. In a disk tiller of the class described, the combination of a frame, a plurality of wheels on which said frame is adjustably supported, a plurality of gang sections mounted on said frame comprising independently rotatable sets of disks all substantially aligned on a common axis which is inclined to the line of draft of said frame, one of said gang sections being removable from said frame, a draft member for said frame, and means connecting said draft member with said frame permitting displacement of said draft member along a line parallel to the axis of the disks to displace the line of draft relative to said frame upon the removal or replacement of said latter gang section.

7. In a disk tiller of the class described, the combination of frame means comprising a beam extending at an angle to the line of draft and a draft frame, a plurality of wheels on which said frame means is adjustably supported, a plurality of gang sections mounted on said beam comprising independently rotatable sets of disks all substantially aligned on a common axis extending approximately parallel to said beam, one of said gang sections being removable, and means detachably connecting said draft frame with said beam whereby said draft frame can be shifted laterally along said beam to displace the line of draft relative thereto upon the removal or replacement of said latter gang section.

8. In a disk tiller of the class described, the combination of a beam extending at an angle to the line of draft, a land wheel and a rear furrow wheel connected with the rear portion of said beam, lifting levers operatively connected between said wheels and said beam for raising and lowering the rear portion of the beam, a draft frame at the front end of said beam, a front furrow wheel supporting said draft frame, a lifting lever operatively connected between said draft frame and said wheel for raising and lowering said frame, a plurality of gang sections mounted on said beam comprising independently rotatable sets of disks all substantially aligned on a common axis which extends approximately parallel with said beam, one of said gang sections being removable from said beam, and means joining said draft frame with said beam whereby said draft frame together with said front furrow wheel can be shifted laterally along said beam to displace the line of draft when said latter gang section is removed or replaced.

9. In a disk tiller of the class described, the combination of a frame, a plurality of wheels adjustably supporting said frame, a plurality of gang sections mounted on said frame comprising independently rotatable sets of disks all substantially aligned on a common axis which is inclined to the line of draft of said frame, each of said gang sections comprising an axle on which the set of disks is mounted, bearing surfaces on said axle adjacent to the ends thereof, bearing hubs cooperating with said bearing surfaces, and means for mounting each of said bearing hubs on the frame comprising a pair of bars having their lower ends embracing and secured to opposite sides of the said hub and their upper ends secured to said frame.

10. In a disk tiller of the class described, the combination of a frame, a plurality of wheels on which said frame is adjustably supported, a gang of disks mounted on said frame with all of the disks substantially aligned on a common axis disposed at an angle to the line of draft, said gang comprising an axle on which the disks are mounted, thrust bearing surfaces on said axle adjacent to the ends thereof, bearing hubs co-operating with said bearing surfaces, and a hanger member for each bearing hub comprising a pair of bars secured at their upper ends to said frame and having their lower ends separated to form an inverted U-shaped yoke in which said hub is mounted.

11. In a disk tiller of the class described, the combination of a frame, a gang of disks mounted on said frame with all of the disks substantially aligned on a common axis disposed at an angle to the line of draft, said gang comprising a bearing spindle adjacent to one end thereof, a bearing hub engaging over said spindle, a thrust bearing surface on said hub of curved longitudinal section, a collar on said spindle having an annular groove in one face thereof partially embracing said thrust bearing surface, a dirt excluding flange on said collar extending longitudinally to overlie the thrust bearing joint between said spindle and said bearing hub, and then extending outwardly substantially radially to form an annular shroud ring and means for mounting said bearing hub on said frame.

12. In a disk tiller of the class described, the combination of a frame, a gang of disks mounted on said frame with all of the disks substantially aligned on a common axis disposed at an angle to the line of draft, said gang comprising a tapered bearing spindle adjacent to one end thereof, a tapered bearing hub engaging over said spindle, a thrust bearing surface of rounded form at the large end of said hub, a collar on the large end of said spindle having a groove in one side thereof correspondingly rounded to engage with the thrust bearing surface of said hub, a dirt excluding flange rotating with said spindle and overlying one end of said bearing hub and then extending outwardly substantially radially therefrom, and means for mounting said bearing hub on said frame.

13. In a disk tiller of the class described, the combination of a frame, a gang of disks mounted on said frame with all of the disks substantially aligned on a common axis disposed at an angle to the line of draft, said gang comprising an axle having a bearing surface adjacent to one end thereof, a bearing hanger secured to said frame and having a bearing surface cooperating with the bearing surface on said axle, and flanges rotating with said axle and projecting outwardly substantially radially over the ends of the hanger bearing surface for forming a shroud around said bearing surfaces to prevent the entrance of dirt thereto.

14. In a disk tiller of the class described, the combination of a frame, a gang of disks mounted on said frame with all of the disks substantially aligned on a common axis disposed at an angle to the line of draft, said gang comprising an axle having a tapered bearing surface adjacent to one end thereof, a bearing hanger secured to said frame and having a tapered bearing surface cooperating with the bearing surface on said axle, and flanges revolving with said axle and overlying the opposite ends of said bearing surfaces and projecting outwardly substantially radially to prevent the entrance of dirt thereto.

15. In a disk tiller of the class described, the combination of a frame, a plurality of wheels comprising a front furrow wheel adjustably supporting said frame, steering means connected with said front furrow wheel, a plurality of gang sections mounted on said frame comprising independently rotatable sets of disks, said gang sections being mounted on said frame with all of the disks facing in the same direction and substantially aligned on a common axis which is inclined to the line of draft of said frame, one of said gang sections being removable from said frame, and mounting means for said front furrow wheel permitting the latter together with its steering means to be displaced inwardly along a line parallel to the axis of the disks upon the removal of said gang section.

16. In a disk tiller of the class described, the combination of a frame, a plurality of wheels comprising a front furrow wheel supporting said frame, lifting means cooperating with said front furrow wheel for raising and lowering said frame relatively thereto, a plurality of gang sections mounted on said frame comprising independently rotatable sets of disks, said gang sections being mounted with all of the disks facing in the same direction and substantially aligned on a common axis which is inclined to the line of draft of said frame, one of said gang sections being removable from said frame, and mounting means for said front furrow wheel permitting the latter together with its lifting means to be displaced inwardly along said frame and along a line parallel to the axis of the disks upon the removal of said gang section.

17. In a disk tiller of the class described, the combination of a beam extending at an angle to the line of draft, a land wheel and a rear furrow wheel connected with the rear portion of said beam, a draft frame at the front end of said beam, a front furrow wheel attached to said draft frame, a draft connection extending forwardly from said draft frame, steering means extending between said draft connection and said front furrow wheel, a lifting lever operatively connected between said draft frame and said front furrow wheel for raising and lowering said beam, a plurality of gang sections mounted on said beam comprising independently rotatable sets of disks, said sections being mounted with all of the disks facing in the same direction and substantially aligned on a common axis extending approximately parallel with said beam, the front gang section being removable from said beam, and means securing said draft frame with said beam whereby said draft frame together with said front furrow wheel, said steering means and said lifting lever can be shifted laterally as a unit inwardly along said beam when said front gang section is removed.

18. In a disk tiller of the class described, the combination of a frame, a plurality of wheels adjustably supporting said frame, a plurality of gang sections mounted on said frame comprising independently rotatable sets of disks all substantially aligned on a common axis which is inclined to the line of draft of said frame, each of said gang sections comprising an axle on which the set of disks is mounted, bearing surfaces on said axle adjacent to the ends thereof, bearing hubs cooperating with said bearing surfaces, means for mounting each of said bearing hubs on the frame comprising a pair of bars having their upper ends secured to said frame and having their lower ends embracing opposite sides of said hub, shoulders on said hub for engaging the front and rear edges of both bars, and a bolt extending transversely through said hub and through said bars for securing the bars to the hub.

19. In a farm implement, the combination of a beam comprising two spaced side members, a plurality of wheels adjustably supporting said beam with the latter extending at an angle to the line of draft of the implement, a disk having an axle, and a bearing arm in which said axle is journaled, the upper end of said bearing arm being mounted between the side members of said beam.

20. In a farm implement, the combination of a frame, front and rear furrow wheels and a land wheel supporting said frame, lifting levers operatively connected for adjusting the height of said frame relative to said wheels, a beam constituting a part of said frame and comprising two spaced substantially parallel beam bars extending at an angle to the line of draft, an axle, a disk on said axle, and a bearing arm in which said axle has bearing support, said bearing arm having its upper end secured between said beam bars.

21. In a farm implement, the combination of a beam comprising two spaced side members, a plurality of wheels adjustably supporting said beam with the latter extending at an angle to the line of draft of the implement, a bearing arm, a disk mounted on said arm, the upper end of said bearing arm being bent horizontally and mounted between the side members of said beam, and means for effecting said mounting of the horizontal portion of the arm between said side members.

WALTER H. SILVER.